Oct. 28, 1958 M. O. BERGER ET AL 2,857,953
AUXILIARY SEAT FOR STROLLERS
Filed Feb. 5, 1957 2 Sheets-Sheet 1
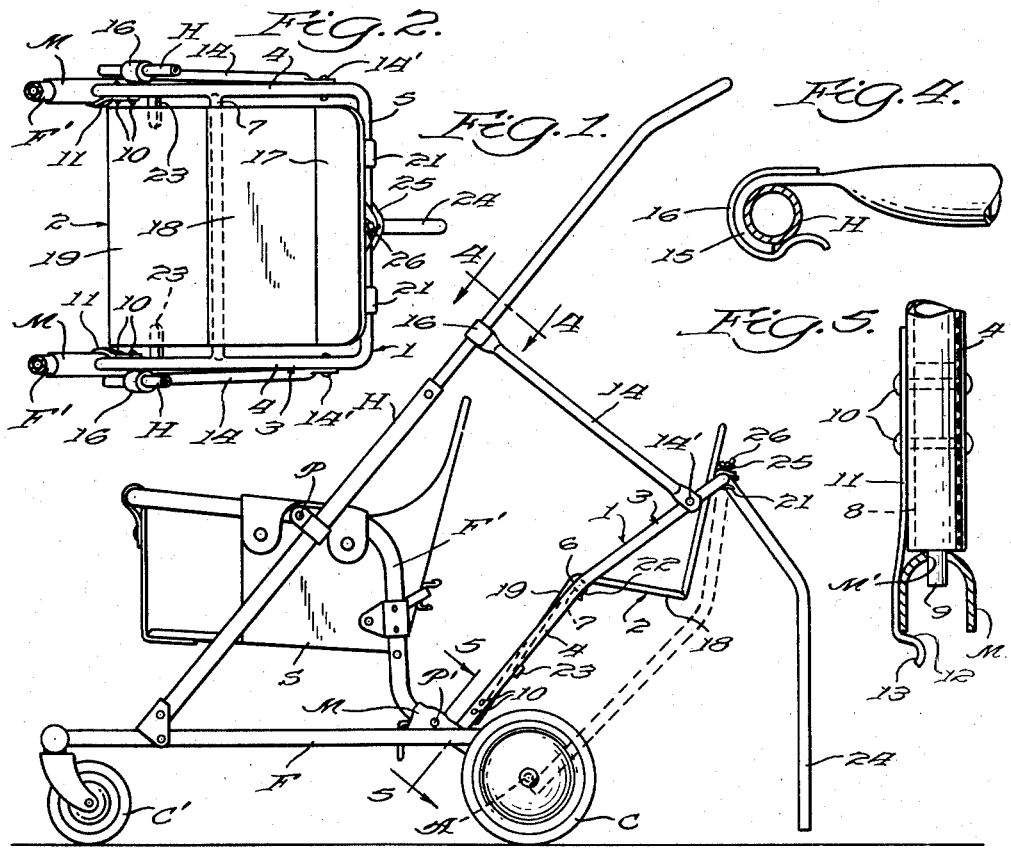

Oct. 28, 1958  M. O. BERGER ET AL  2,857,953
AUXILIARY SEAT FOR STROLLERS
Filed Feb. 5, 1957  2 Sheets-Sheet 2
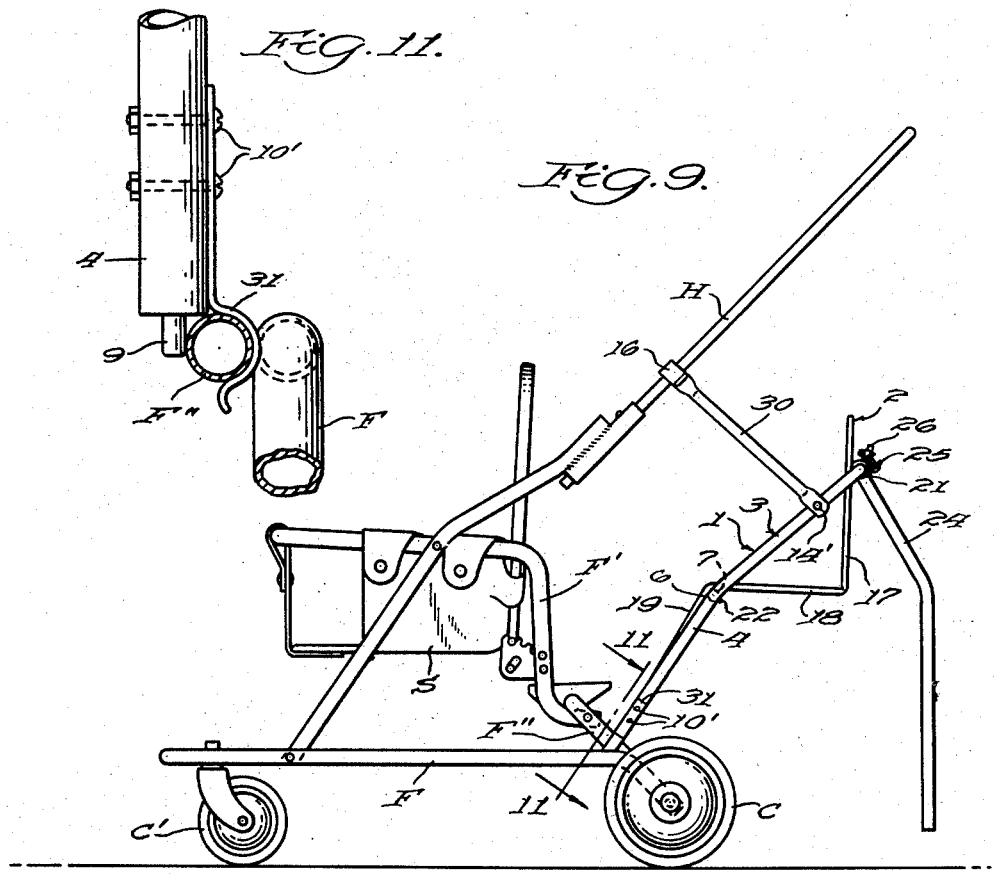
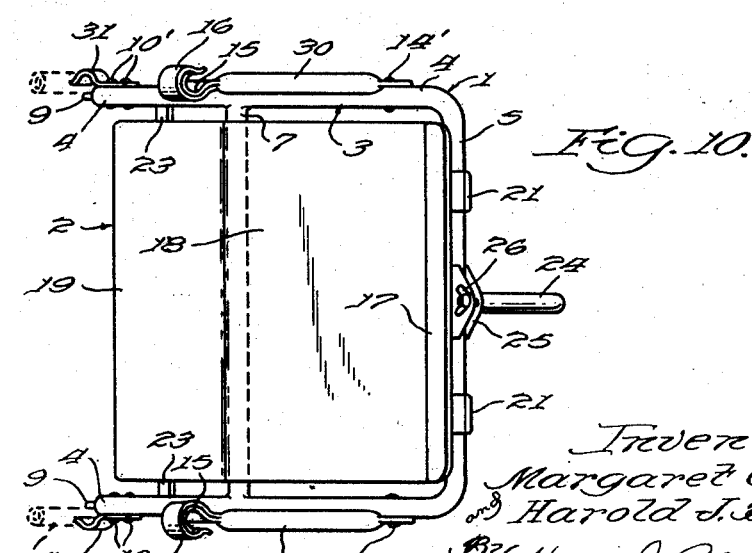
Inventors:
Margaret O. Berger
and Harold J. Berger.

United States Patent Office 2,857,953
Patented Oct. 28, 1958

2,857,953

AUXILIARY SEAT FOR STROLLERS

Margaret O. Berger and Harold J. Berger,
La Canada, Calif.

Application February 5, 1957, Serial No. 638,415

4 Claims. (Cl. 155—10)

This invention relates to strollers for transporting infants and more particularly to a detachable auxiliary seat therefor whereby two children may be accommodated where desired.

The principal object of the invention is to provide a detachable auxiliary seat for attachment to the rear of a stroller and which includes means for supporting the stroller against being upset by the weight of a child seated in the said auxiliary seat.

Another object of the invention is to provide an auxiliary seat for strollers comprising a foldable frame component and a foldable seat forming component which is readily detachable from the frame component to facilitate cleaning of the seat component.

Still another object of the invention is to provide an auxiliary seat for strollers in which the foregoing objectives are realized in practice, which is simple in construction, susceptible of economical manufacture, neat in appearance, is readily attached to and detached from a stroller, and which is reliable for its intended purpose.

With the foregoing objects in view, together with such additional objects and advantages as may subsequently appear, the invention resides in the parts, and in the construction, combination and arrangement of parts disclosed, by way of example, in the following specification of certain presently preferred embodiments of the invention; reference being had to the accompanying drawings which form a part of said specification and in which drawings:

Fig. 1 is a side elevational view of a stroller showing an auxiliary seat embodying the invention attached thereto, Fig. 2 is a top plan view of the auxiliary seat shown in position of use on the stroller as in Fig. 1; certain portions of the stroller to which the seat is attached being also shown, Fig. 3 is a rear elevational view of the auxiliary seat as mounted on a stroller with the engaged portions of the stroller being also shown.

Fig. 4 is an enlarged, transverse sectional view taken on the line 4—4 of Fig. 1 showing the mode of attachment of the auxiliary seat to the stroller handle, Fig. 5 is an enlarged, sectional view taken on the staggered line 5—5 of Fig. 1 showing the mode of attachment of the auxiliary seat to the stroller frame structure, Fig. 6 is an enlarged, sectional view taken on the line 6—6 of Fig. 3 showing the construction of the upset preventing means with respect to the auxiliary seat frame component, Fig. 7 is a side elevational view showing the auxiliary seat as folded up when removed and not in use, Fig. 8 is a perspective view of the seat component removed from the frame component, Fig. 9 is a side elevational view similar to Fig. 1 but showing the auxiliary seat applied to another form of folding stroller, Fig. 10 is a top plan view of the extended seat shown in Fig. 9, and Fig. 11 is an enlarged fragmentary sectional view taken on the line 11—11 showing the mode of attachment of the lower portion of the seat to the stroller frame.

Referring to the drawings and particularly Fig. 1, the invention is shown applied to a folding type of stroller comprising a frame F supported by fixed rear casters C and dirigible front casters C', an upwardly and rearwardly extending handle H of inverted U-shape having the ends thereof pivotally attached to the frame F adjacent the forward end thereof, and a seat S supported by a frame component F' hingedly connected to the handle H at P and at its rear end hingedly connected at P' to a sheet metal member M which is of inverted U-shape in cross section at the point of engagement with the end of the frame component F' and which is pivotally mounted on the axle A for the rear casters. The said stroller forms no part of the present invention and is described so that the relation of the invention and its mode of attachment to the stroller can be better understood as the description of the invention proceeds.

The auxiliary seat comprises a frame component 1 and a seat component 2 detachably connected to the frame component by means hereinafter described. The frame component comprises a main frame member 3 of inverted U-shape formed preferably of metal tubing and having the legs 4, 4 extending diagonally downward from the end portion 5 thereof and being slightly bent as shown at 6, the legs further being interconnected by a cross member 7 formed of tubing and welded or brazed to the leg members at about the point of the bends 6 therein. At their lower ends, the leg members each carry a plug member 8 inserted therein each of which terminates in an axially disposed pin 9 insertable in a hole M' which exists in the frame member M (see Fig. 5). The plugs 8, 8 are secured in their respective leg portions by rivets 10 which additionally secure a leaf spring element 11 extending therefrom beyond the lower edge of the frame member M and terminate in a latching face 12 adapted to fit beneath the member M and in a sloping terminal end portion 13 effective to displace the end of the spring as the pin 9 enters the hole M' and thereafter allow the spring to snap beneath the member M' to lock the legs 4, 4 to the said frame member. Adjacent the end portion 5 the leg members 4, 4 each carry a link 14 having one end thereof pivotally connected thereto by a rivet 14', the other end of the link being formed into a hook 15 adapted to engage the side members of the handle H (see Fig. 4) said hooked end further carrying a leaf spring member 16 having one end attached to the link adjacent the hook and thence extending around and beyond the hook and terminating in a detent portion engaging the handle H beyond the end of the hook and thus detachably latchingly connecting the hooked end of the line to the stroller handle H.

The seat component 2 comprises three board like members of slightly less width than the space between the leg members 4, 4 and include a back member 17, a seat member 18 and a leg board 19; the said boards being enclosed in end to end relation in a fabric or flexible plastic cover 20 with interposed padding, if desired, with the adjacent ends of the boards being slightly spaced from each other so that the covering fabric may additionally serve as hinge means between the boards. The rear face of the back member 17 adjacent the upper end thereof is provided with a pair of spring clips 21, 21 adapted to yieldingly engage the end portion 5 of the frame member 3 and the seat member 18 adjacent the end hinged to the leg board 19 is provided with a similar pair of spring clips 22, 22 adapted to yieldingly engage the cross member 7. When thus installed on the frame member 3, the back and seat members are correctly positioned on the frame member to form the seat and the leg board extends downwardly and forwardly parallel to the lower portions of the legs 4, 4 with the lower end thereof supported by arms 23, 23 projecting laterally from the legs 4, 4 above and adjacent to the uppermost of the rivets 10.

If a child is placed in the auxiliary seat while the stroller seat is unoccupied, there is danger that the stroller would be upset and hence it is desirable that means be provided to prevent this from happening. To this end a brace leg 24 is provided with a clamp 25 at its upper end surrounding the end portion 5 of the frame 3; said clamp gripping the said end portion with adjustable friction derived from operation of a thumbscrew 26 connecting the ends of the clamp. From the clamp the brace leg extends diagonally rearwardly and downwardly and thence vertically when in the position of use; the bend therein being required to allow the brace to clear the seat when it is swung out of the way to the position shown in dotted lines in Fig. 1 in which position the lower end of the brace is adjacent to the axle A. The extent of this movement of the brace leg is limited by a screw 27 extending through the upper arm of the clamp 25 in rear of the clamp screw 26 and engaging a slot 28 extending transversely of the end portion 5 of the frame member 3 (see Fig. 6).

When not in use, the auxiliary seat can be folded into a compact package by disengaging the clamps 21, 21 from the end member 5 to permit the seat component to be positioned approximately parallel to the frame component and bringing the links 14 and the brace leg 24 into substantial parallelism with the frame component as shown in Fig. 7. If it is desired to clean the seat component, releasing the spring clips 21, 21 and 22, 22 from their respective engagements with the frame component as shown by Fig. 8, will permit this to be done.

Figs. 9, 10 and 11 show a modification of the auxiliary seat to accommodate another form of stroller such as shown on Patent No. 2,728,580. In this form of stroller, the frame F is formed in a U-shape with the ends thereof bent downwardly and secured to the axle of the casters C. The seat supporting frame member F' is pivoted at one point to the handle H and the ends thereof are pivoted to a wide shallow U-shaped frame component F'' having its ends connected to the axle for the casters C closely adjacent and inside of the ends of the frame member F.

The modification of the auxiliary seat to accommodate this stroller is simple and consists in the substitution of slightly shorter links 30, 30 for the links 14 and the substitution of spring clips 31, 31 for the spring elements 11, 11 at the lower ends of the leg members 4, 4; said clips being secured by rivets or screws 10', 10'. These spring clips extend beyond the ends of the legs 4, 4 and are positioned on the outside of the leg members. The frame element F'' is formed from tubing and the ends of the clips 31, 31 are rounded in approximately a half circle to engage the frame element F'' when the end of the leg 4 is resting on the outer surface of the tubing with the pin 9 extending along the opposite face of the tubing (see Fig. 11). The clip is prevented from sliding downwardly along the downwardly inclined leg of the frame element F'' by contact with the adjacent face of the end of the frame member F. So long as the edge of the clip is wedged between the adjacent frame members, it can not be sprung open, it being necessary first to move it upwardly along the leg portion of the frame member F'' sufficiently to be clear of the frame member F before it can be sprung away to remove the seat therefrom. The parts which are not affected by the above described modification have been given the same identifying numerals and repetition of the description is deemed unnecessary.

Thus, there has been provided an auxiliary seat for strollers which is readily attached to the strollers without requiring modification of the strollers and which can be as readily removed therefrom. The seat is simple in construction and when not in use, it can be folded into a small package. It is safe to use since means is provided to prevent the upsetting of the stroller in the event that a child is left in the auxiliary seat without a child being also in the stroller seat.

While a presently preferred form of the invention has been disclosed by way of example in the foregoing specification, it is not to be inferred therefrom that the invention is limited to the exact form thus disclosed, and it will be understood that the invention embraces all such changes and modifications in the parts and in the construction, combination and arrangement of parts as shall come within the purview of the appended claims.

We claim:

1. An accessory for baby strollers of the type having a frame structure supported by front and rear casters, a seat supported above said frame structure and a handle means of inverted U-configuration having the ends thereof attached to the sides of the frame structure and thence extending upwardly and rearwardly; said accessory comprising an auxiliary seat positioned in the rear of the seat supported above the frame structure and including a supporting framework comprising a main frame member of inverted U-shape having means affording detachable engagement with the stroller frame structure and thence extending diagonally rearwardly and upwardly and a cross member interconnecting said side members between their ends and a seat element comprising a back member, a bottom member, and a leg supporting member hingedly interconnected in end to end relation and having means for detachable engagement with said main frame member.

2. An accessory for baby strollers of the type having a frame structure supported by front and rear casters, a seat supported above said frame structure and a handle means of inverted U-configuration having the ends thereof attached to the sides of the frame structure and thence extending upwardly and rearwardly; said accessory comprising an auxiliary seat adapted to be positioned in the rear of the seat supported above the frame structure and including a supporting framework having means affording detachable connection with the frame structure adjacent to the rear casters, other means affording detachable connection with the handle means of the stroller, a seat element comprising a bottom element, a back element and a leg supporting board carried by said framework, and a brace leg element pivotally mounted on said framework and movable thereon into a substantially vertical position in which it is effective to engage the ground to prevent upsetting of the stroller by the weight of a child occupying said auxiliary seat.

3. An accessory for baby strollers of the type having a frame structure supported by front and rear casters, a seat supported above said frame structure and a handle means of inverted U-configuration having the ends thereof attached to the sides of the frame structure and thence extending upwardly and rearwardly; said accessory comprising an auxiliary seat adapted to be positioned in the rear of the seat supported above the frame structure and including a supporting framework comprising a main frame member of inverted U-shape having means affording detachable engagement with the stroller frame structure and thence extending diagonally rearwardly and upwardly and a cross member interconnecting said side members between their ends, a seat element comprising a back member, a bottom member, and a leg supporting member hingedly interconnected in end to end relation and having means for detachable engagement with said main frame member, and a brace leg element pivotally mounted on the rearmost portion of said framework and movable thereon between a position inclining downwardly and forwardly beneath said seat element to a substantially vertical position effective to engage the ground and prevent upsetting of the stroller by the weight of a child occupying said auxiliary seat.

4. An auxiliary seat for strollers of the type having a frame structure mounted on front and rear casters and supporting a seat disposed above the frame structure and having a handle means comprising upwardly and rearwardly inclined members connected to the frame structure at their lower ends and connected together by a horizontal portion at their upper ends; said auxillary seat being detachably mountable directly in the rear of the stroller seat and having means affording detachable engagement with the stroller frame structure adjacent the rear end thereof, and other means affording detachable engagement with the side members of the stroller handle means; said auxiliary seat comprising a rigid frame including a member comprising side elements extending parallel to each other and interconnected at one end by an integrally formed cross member, the opposite ends of said elements being provided with said means detachably engaging the stroller frame structure adjacent the end thereof, a rigid cross member interconnecting said side elements between their ends, and a seat forming means detachably engaging said cross members and comprising a series of three rigid board-like elements hingedly connected in end to end relation and forming a back member, a bottom member, and a leg supporting member; said back member adjacent the upper end thereof having spring clip means detachably engaging said first named cross member of said frame member, said bottom member at the end thereof remote from said back member having spring clip means detachably engaging said second named cross member, and said side elements each adjacent the frame structure engaging ends thereof having bracket means upon which the lower end of said leg supporting member is supported.

References Cited in the file of this patent

UNITED STATES PATENTS

| | | |
|---|---|---|
| 264,157 | Hepburn | Sept. 12, 1882 |
| 1,235,347 | Lutostanski | July 31, 1917 |
| 1,245,679 | Carroll | Nov. 6, 1917 |
| 1,302,444 | Silvarman | Apr. 29, 1919 |
| 1,372,538 | Olson | Mar. 22, 1921 |

FOREIGN PATENTS

| | | |
|---|---|---|
| 154,761 | Great Britain | Dec. 9, 1920 |